United States Patent
An et al.

(10) Patent No.: US 12,135,429 B2
(45) Date of Patent: Nov. 5, 2024

(54) PUPIL-STEERING FOR THREE-DIMENSIONAL (3D) RESOLUTION ENHANCEMENT IN SINGLE PHOTON AVALANCHE DIODE (SPAD) EYE TRACKING (ET)

(71) Applicant: Meta Platforms Technologies, LLC, Menlo Park, CA (US)

(72) Inventors: Yatong An, Redmond, WA (US); Youmin Wang, Bellevue, WA (US); Zhaoyu Nie, Kenmore, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 77 days.

(21) Appl. No.: 18/077,653

(22) Filed: Dec. 8, 2022

(65) Prior Publication Data

US 2024/0192493 A1    Jun. 13, 2024

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0833* (2013.01); *G02B 27/0179* (2013.01); *G06F 1/163* (2013.01); *G06F 3/013* (2013.01); *G06T 3/4007* (2013.01); *G06T 3/4038* (2013.01); *G06T 3/4053* (2013.01); *H04N 23/56* (2023.01); *G02B 2027/0138* (2013.01); *G02B 2027/014* (2013.01); *G02B 2027/0147* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS 7,783,077 B2    8/2010 Miklos et al.
10,156,900 B2   12/2018 Publicover et al.
(Continued)

OTHER PUBLICATIONS

Kang D., et al., "Content-Aware Eye Tracking for Autostereoscopic 3D Display," Sensors, Aug. 25, 2020, vol. 20, No. 17, 16 pages.
(Continued)

*Primary Examiner* — Samira Monshi
(74) *Attorney, Agent, or Firm* — Mannava & Kang, P.C.

(57) ABSTRACT

Three-dimensional (3D) resolution of a single photon avalanche diode (SPAD) based eye tracking system is enhanced through sensor and/or light source steering. The light source may illuminate the whole eye, while the sensor and/or one or more mirrors associated with the sensor may be steered to capture images of different portions of the eye. The images are stitched to achieve a high-resolution, full view of the eye. Alternatively, the sensor may capture a low-resolution image of the whole eye and be steered to capture multiple low-resolution images, which may be used for interpolation and creation of a high-resolution image of the eye. Both the light source and the sensor (and/or the mirrors) may be steered to illuminate and capture images of different portions of the eye, which may then be stitched to achieve a high-resolution, full view of the eye.

20 Claims, 11 Drawing Sheets

(51) Int. Cl.
  *G06F 1/16*      (2006.01)
  *G06F 3/01*      (2006.01)
  *G06T 3/4007*    (2024.01)
  *G06T 3/4038*    (2024.01)
  *G06T 3/4053*    (2024.01)
  *H04N 23/56*     (2023.01)

(56) References Cited

U.S. PATENT DOCUMENTS

| | | |
|---|---|---|
| 10,203,762 B2   | 2/2019  | Bradski et al. |
| 2022/0050203 A1 | 2/2022  | David Keilaf et al. |
| 2022/0146836 A1 | 5/2022  | Lanman |
| 2023/0418083 A1* | 12/2023 | Zhu ................... G02B 27/0018 |

OTHER PUBLICATIONS

Royo S., et al., "An Overview of Lidar Imaging Systems for Autonomous Vehicles," Applied sciences, Sep. 30, 2019, vol. 9, No. 19, 37 pages.

* cited by examiner

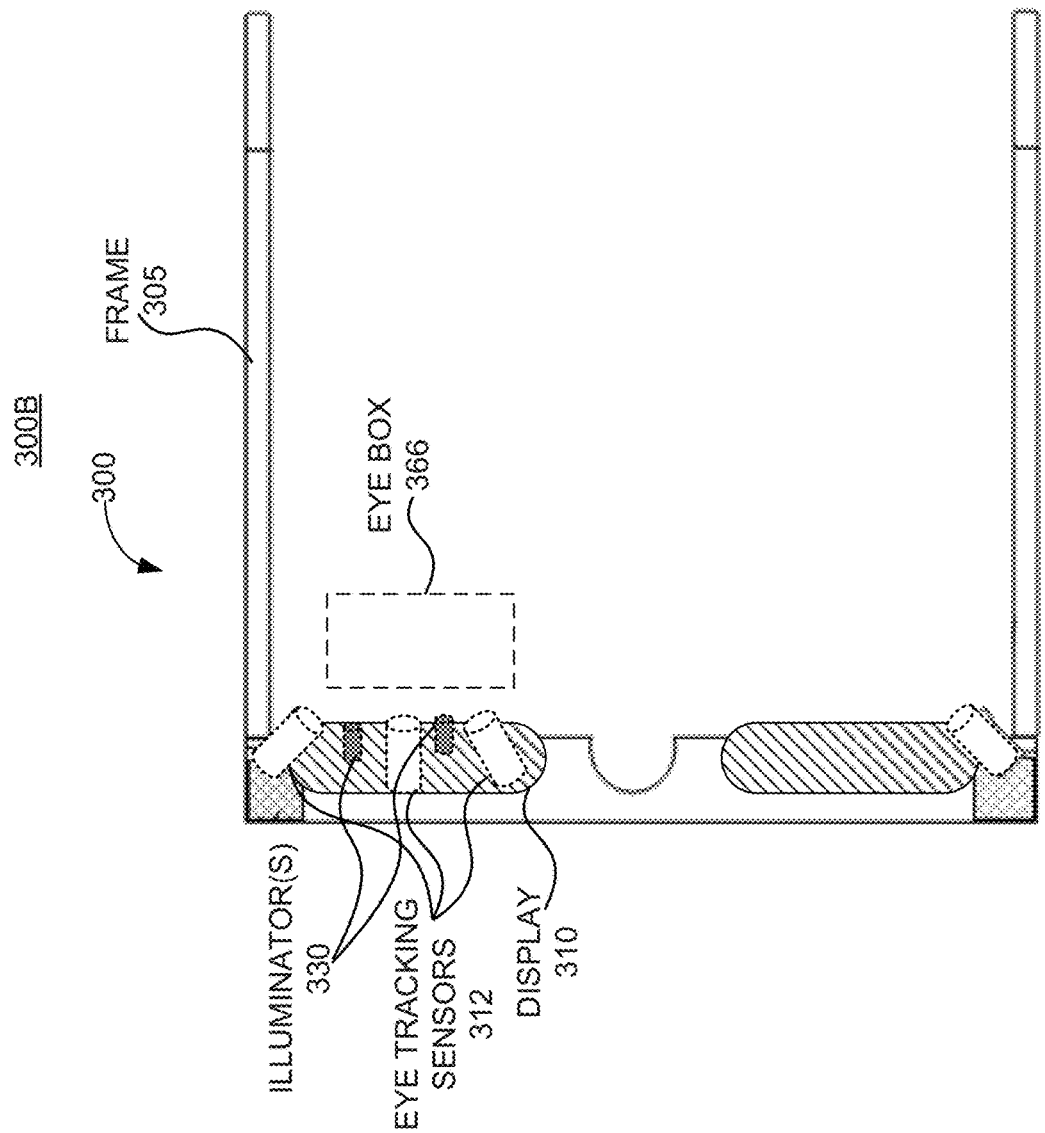

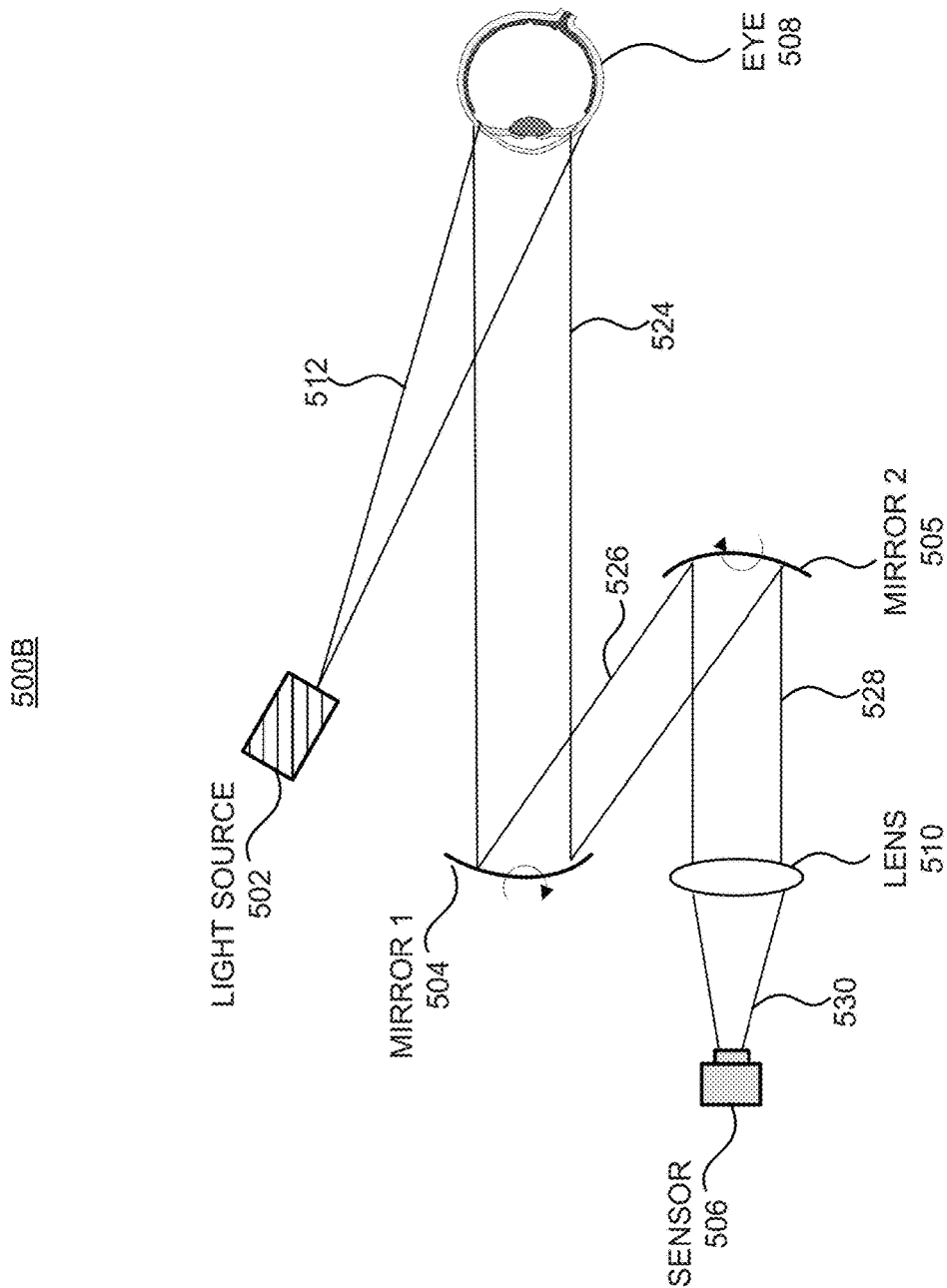

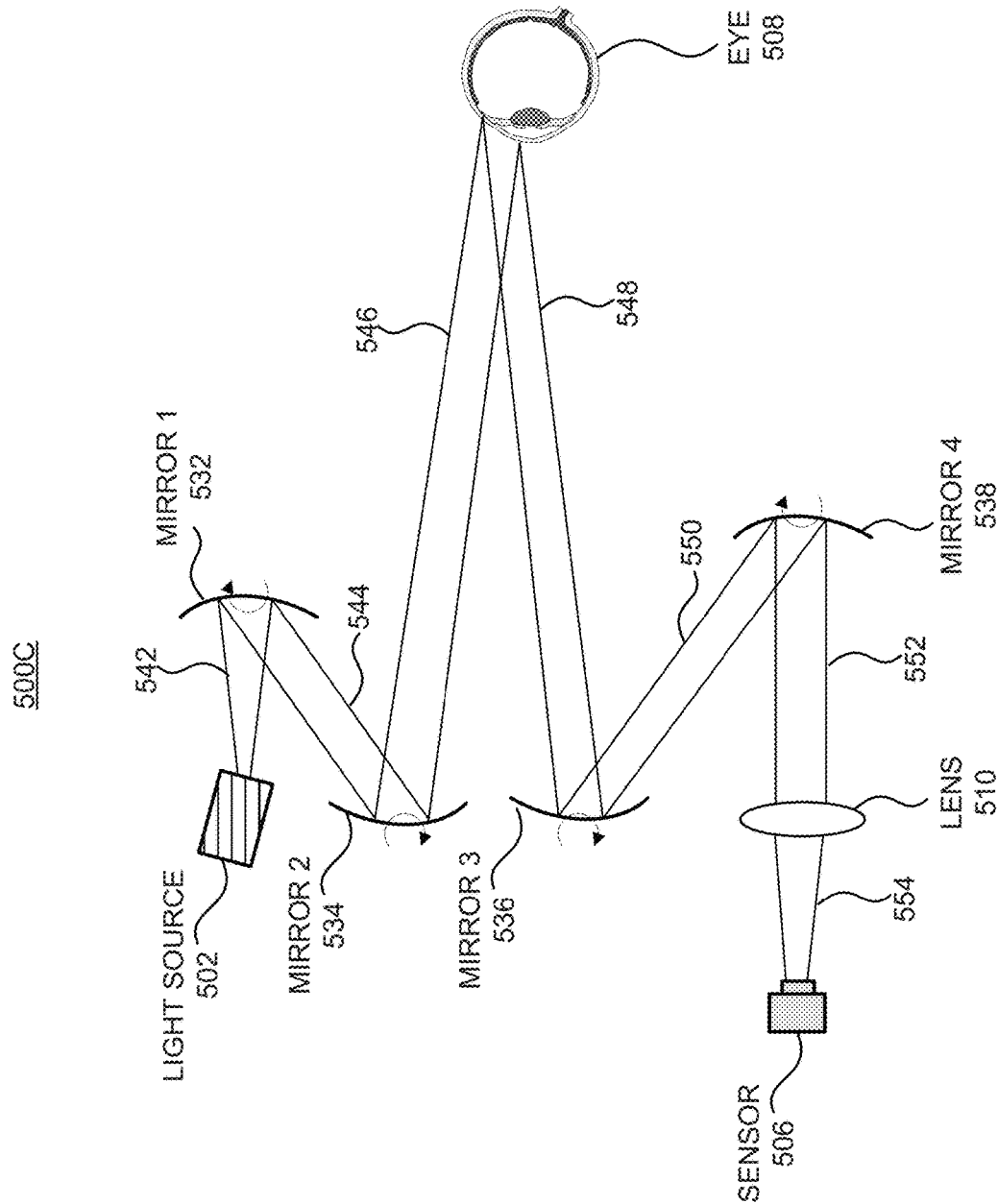

PUPIL-STEERING FOR THREE-DIMENSIONAL (3D) RESOLUTION ENHANCEMENT IN SINGLE PHOTON AVALANCHE DIODE (SPAD) EYE TRACKING (ET)

TECHNICAL FIELD

This patent application relates generally to eye tracking in near-eye display devices, and in particular, enhancement of resolution in single photon avalanche diode (SPAD) based eye tracking (ET) systems through light source and/or sensor steering.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 3A and 3B illustrate a perspective view and a top view of a near-eye display in the form of a pair of glasses, according to an example.

FIGS. 5A-5C illustrate various configurations of a single photon avalanche diode (SPAD) based eye tracking system, where a resolution may be enhanced through projector and/or sensor steering, according to examples.

DETAILED DESCRIPTION

Figure 1:
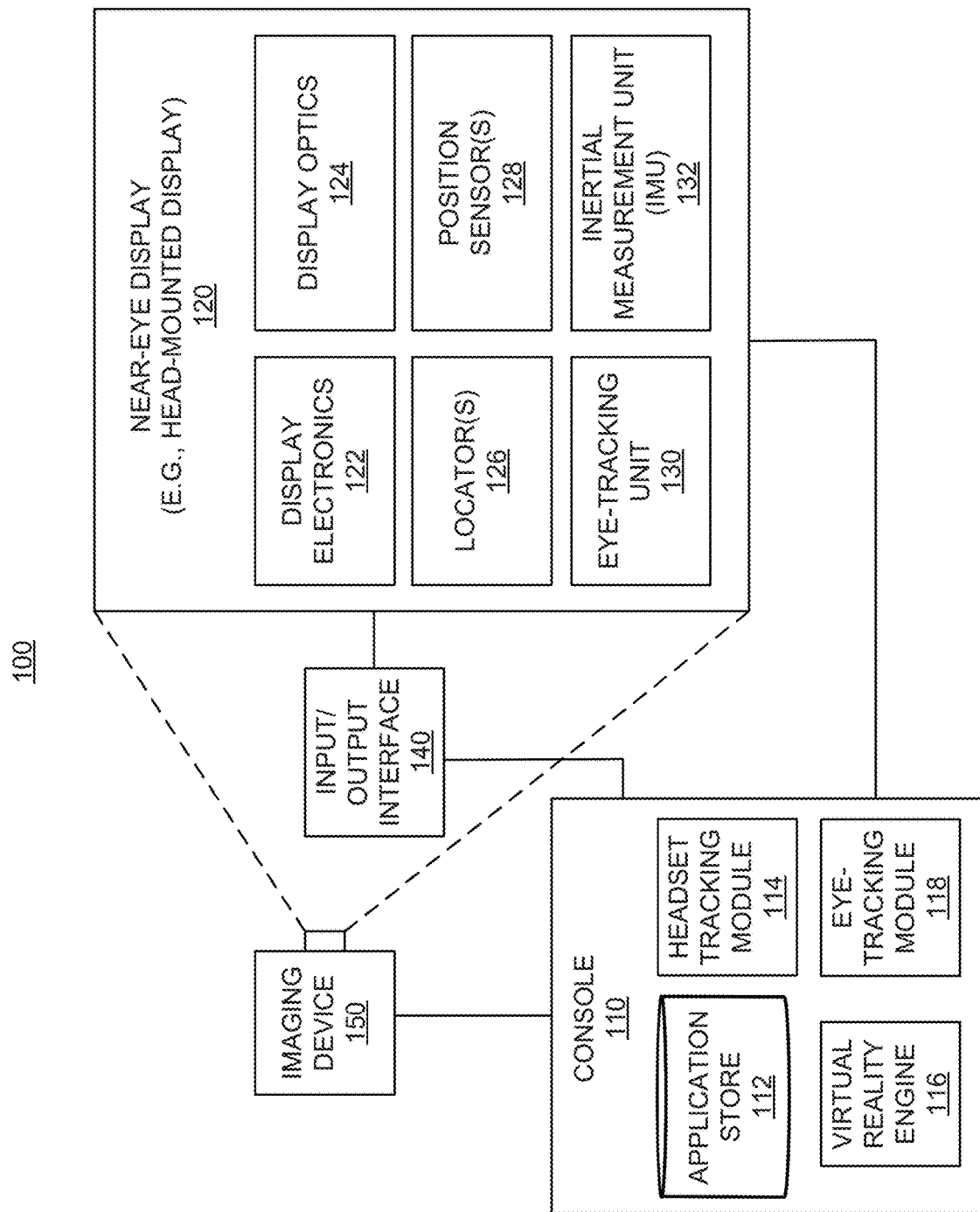
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine three-dimensional (3D) features, is one technique. Another technique utilizes time-of-flight analysis of light projected onto the eye. These and similar techniques involve projection of light, for example, laser light onto the eye and capture of the reflection from the eye at a near distance.

Eye motion can achieve up to 1000 degrees per second. Thus, high speed measurement is critical for eye tracking applications. Such high image capture speeds are difficult to achieve with cameras (unless specialty cameras are used). Specifically, small form factor cameras used in near-eye display devices may be incapable of achieving such capture rates. Single photon avalanche diode (SPAD) sensors are small form factor sensors that can achieve ultra-fast speeds. However, single photon avalanche diode (SPAD) sensors have their own challenges in eye tracking applications, such as limited bandwidth, noise susceptibility to name a few.

In some examples of the present disclosure, three-dimensional (3D) resolution of a single photon avalanche diode (SPAD) based eye tracking system may be enhanced through sensor and/or light source steering. Low-resolution single photon avalanche diode (SPAD) sensors may be used to obtain high-resolution images, and thereby high-resolution three-dimensional (3D) measurements of the eye's features, using pupil-steering technology. Micro-electro-mechanical systems (MEMS) or galvanometric mirrors may be to steer the field-of-view (FoV) of the single photon avalanche diode (SPAD) sensor or the light source (also referred to as the projector), which may be a laser source.

In some examples, the light source may illuminate the whole eye, whereas the sensor itself or one or more mirrors associated with the sensor may be steered to capture small images of different portions of the eye. Images of different portions of the eye may then be stitched to achieve a high-resolution, full view of the eye. In other examples, the light source may illuminate the whole eye, and the sensor may capture a low-resolution image of the whole eye. The sensor itself or one or more mirrors associated with the sensor may be steered to capture multiple low-resolution images, which may then be used for interpolation and creation of a high-resolution image of the eye. In further examples, both the light source and the sensor (or one or more mirrors associated with the sensor) may be steered to illuminate and capture small images of different portions of the eye, which may then be stitched to achieve a high-resolution, full view of the eye.

While some advantages and benefits of the present disclosure are apparent, other advantages and benefits may include reduction of computational resources and increased speed of eye tracking without added complexity of high-speed cameras to the eye tracking system. Furthermore, an accuracy and/or power consumption efficiency of the eye tracking system may also be increased.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120.

Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
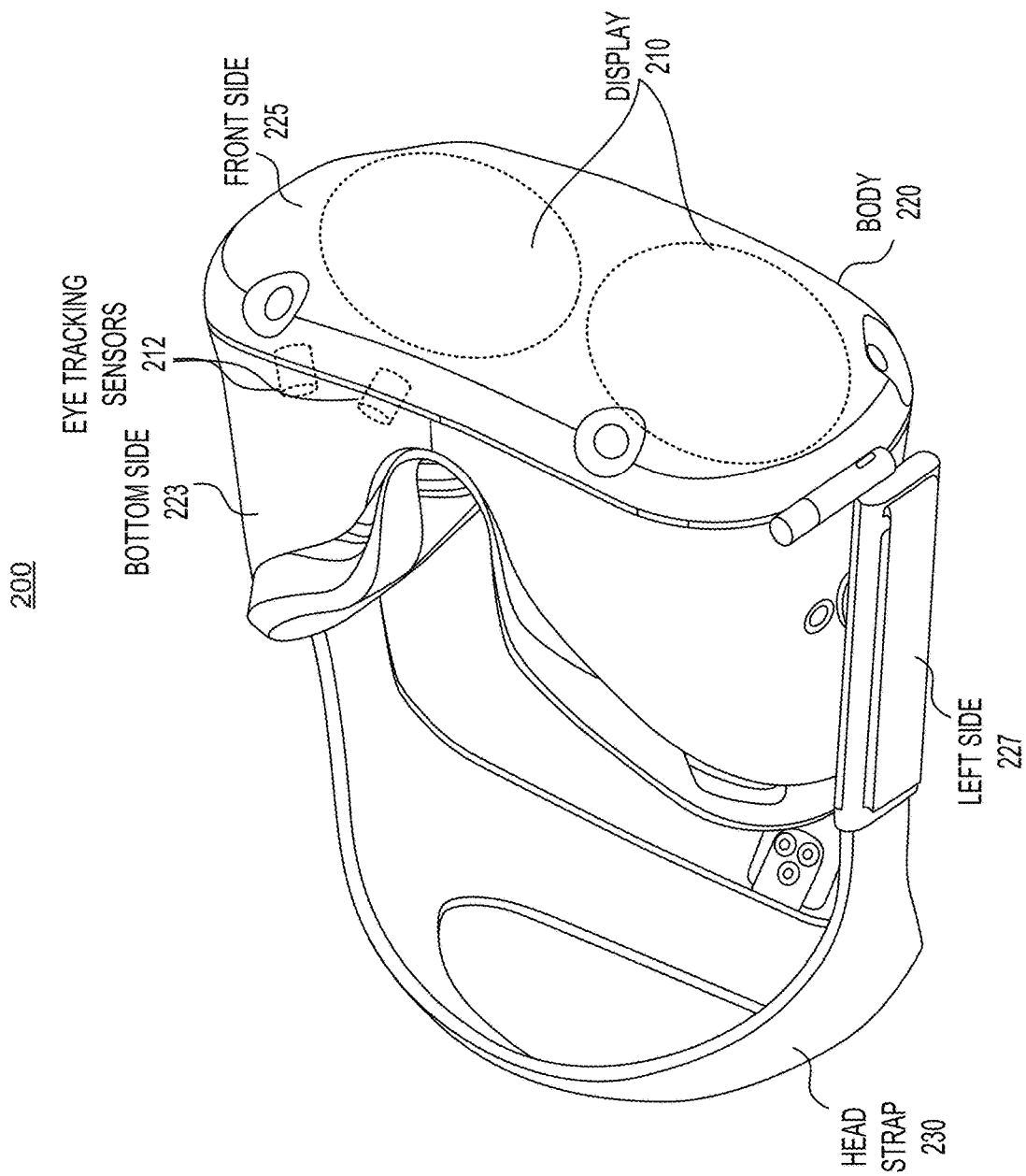
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (fringe pattern) onto the eye which may be captured by the eye tracking sensors 212. The eye tracking sensors 212 or a communicatively coupled processor (e.g., eye tracking module 118 in FIG. 1) may analyze the captured reflection of the fringe pattern and analyze to generate a phase map of the fringe pattern, which may provide depth information for the eye and its structures. In other examples, the projector may be a laser source or similar and time-of-flight computations or captured images of the illuminated eye may be used to determine three-dimensional (3D) features of the eye for eye tracking.

Figure 3A:
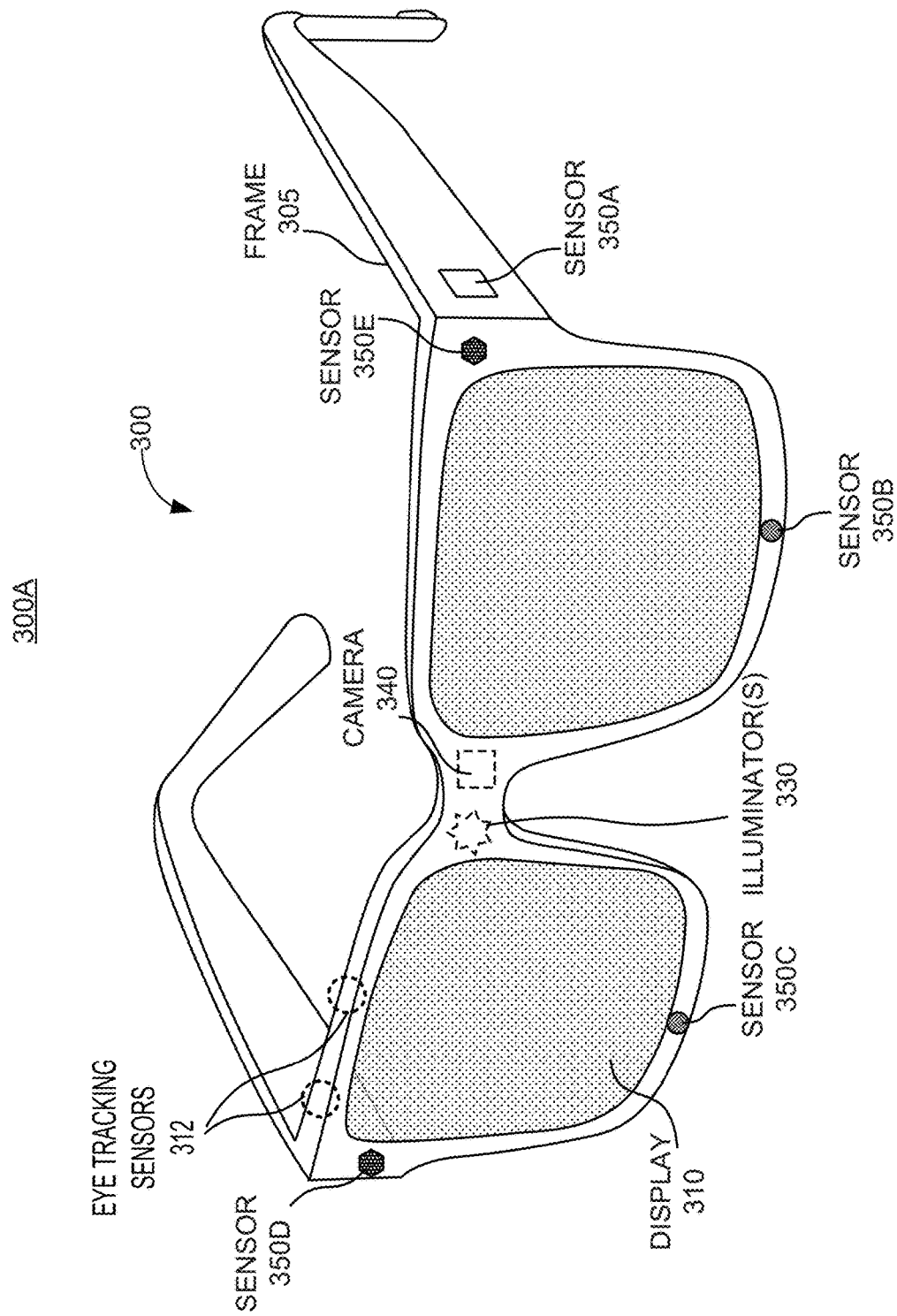

FIG. 3A is a perspective view 300A of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include eye tracking sensors 312.

FIG. 3B is a top view 300B of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, eye tracking sensors 312, and one or more illuminators 330. The illuminators 330 may be used for illuminating an eye box 366, as well as, for providing glint illumination to the eye. A fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking sensors 312 may be used to determine position and/or orientation of both eyes of the user. Once the position and orientation of the user's eyes are known, a gaze convergence distance and direction may be determined. In some examples, the eye tracking sensors 312 may be single photon avalanche diode (SPAD) sensors. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4:
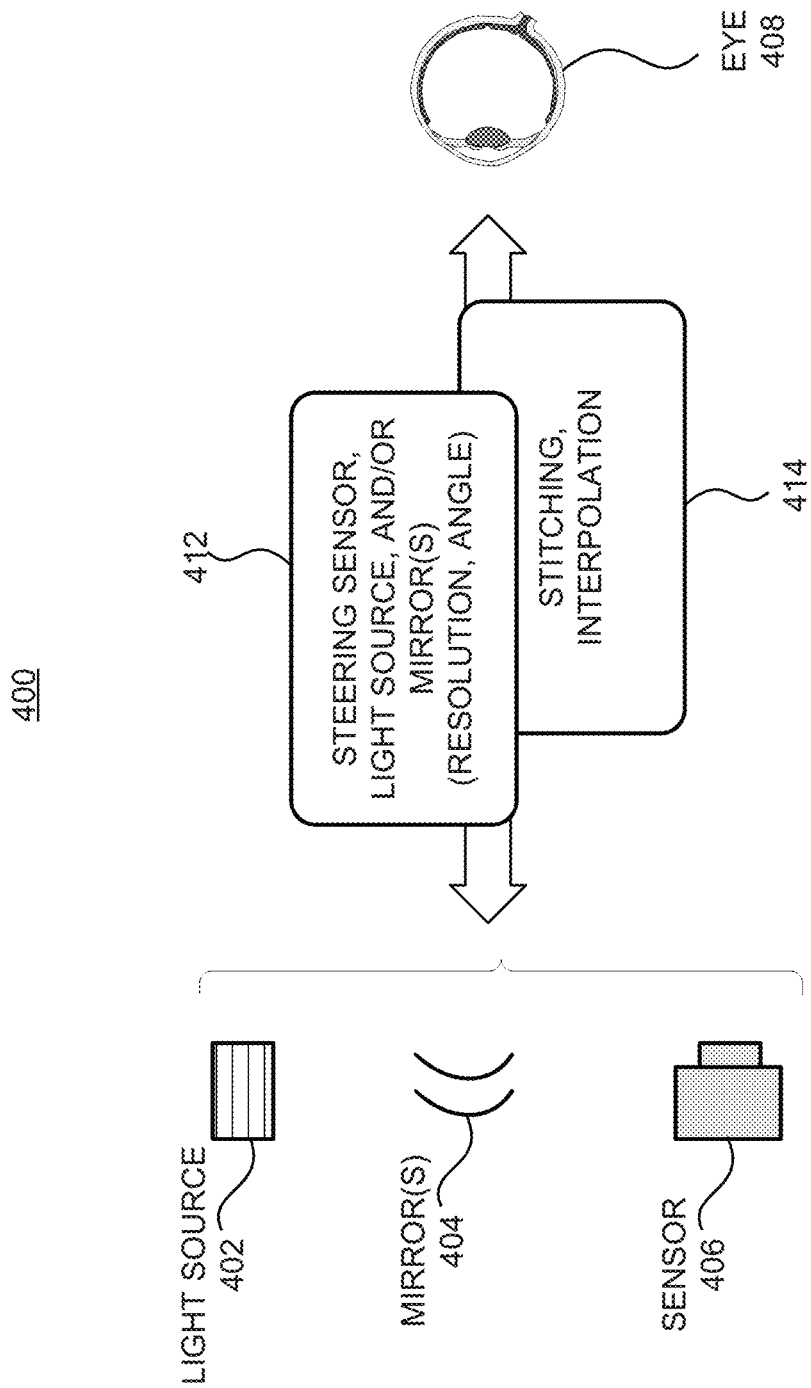
FIG. 4 illustrates a diagram of enhancement of resolution in a single photon avalanche diode (SPAD) based eye tracking system through projector and/or sensor steering, according to examples.

FIG. 4 illustrates a diagram 400 of enhancement of resolution in a single photon avalanche diode (SPAD) based eye tracking system through projector and/or sensor steering, according to examples. Diagram 400 shows a light source 402 to illuminate an eye 408, one or more mirrors 404, and a sensor 406. Enhancement of a three-dimensional (3D) resolution of the eye tracking system may be achieved through steering of the light source 402, the sensor 406, and/or the one or more mirrors 404 along with capture of low-resolution images (412) and stitching or interpolation of captured images for higher resolution images of the eye (414).

In some examples, the light source 402 may be a side-emitting laser diode, a vertical-cavity surface-emitting laser diode, a superluminescent light-emitting diode, or a light-emitting diode (LED). In some implementations, the light source 402 may be infrared or near-infrared (NIR) to avoid distraction of the user. The light source 402, the one or more mirrors 404, and/or the sensor 406 may be coupled to a micro-electro-mechanical system (MEMS) or similar to make them move for pupil steering. The one or more mirrors 404 may also be galvanometric mirrors. The sensor 406 may be a single photon avalanche diode (SPAD) sensor.

Single photon avalanche diode (SPAD) sensors may achieve superfast measurement by increasing gain to decrease the integration time. Because of the high gain property, single photon avalanche diode (SPAD) sensors may be affected by the ambient light easily, leading to noise in the measurement. In some examples, narrow band single photon avalanche diode (SPAD) sensors may be used to address noise challenged in the feature matching process and achieve more accurate measurements. However, such sensors may not be able to capture high-resolution images of the entire eye surface. Thus, pupil steering using one or more of the light source, the mirror(s), and the sensor may be used to enhance the resolution of captured images and detect three-dimensional (3D) features of the eye.

Feature matching refers to finding corresponding features from two similar images based on a search distance algorithm. One of the images may be considered the source and the other as target, and the feature matching technique may be used to either find or derive and transfer attributes from source to target image. The feature matching process may analyze the source and the target image's topology, detect feature patterns, match the patterns, and match the features within the discovered patterns. The accuracy of feature matching may depend on image similarity, complexity, and quality. Thus, reduction of noise due to ambient light in single photon avalanche diode (SPAD) sensors may provide increased accuracy in detection of three-dimensional (3D) features of the eye 408, specifically, the pupil, which may then be used to determine the user's gaze. In other examples, a single photon avalanche diode (SPAD) sensor may also be used to detect eye features through decoding and triangulation, phase unwrapping, and/or image stitching.

Figure 5A:
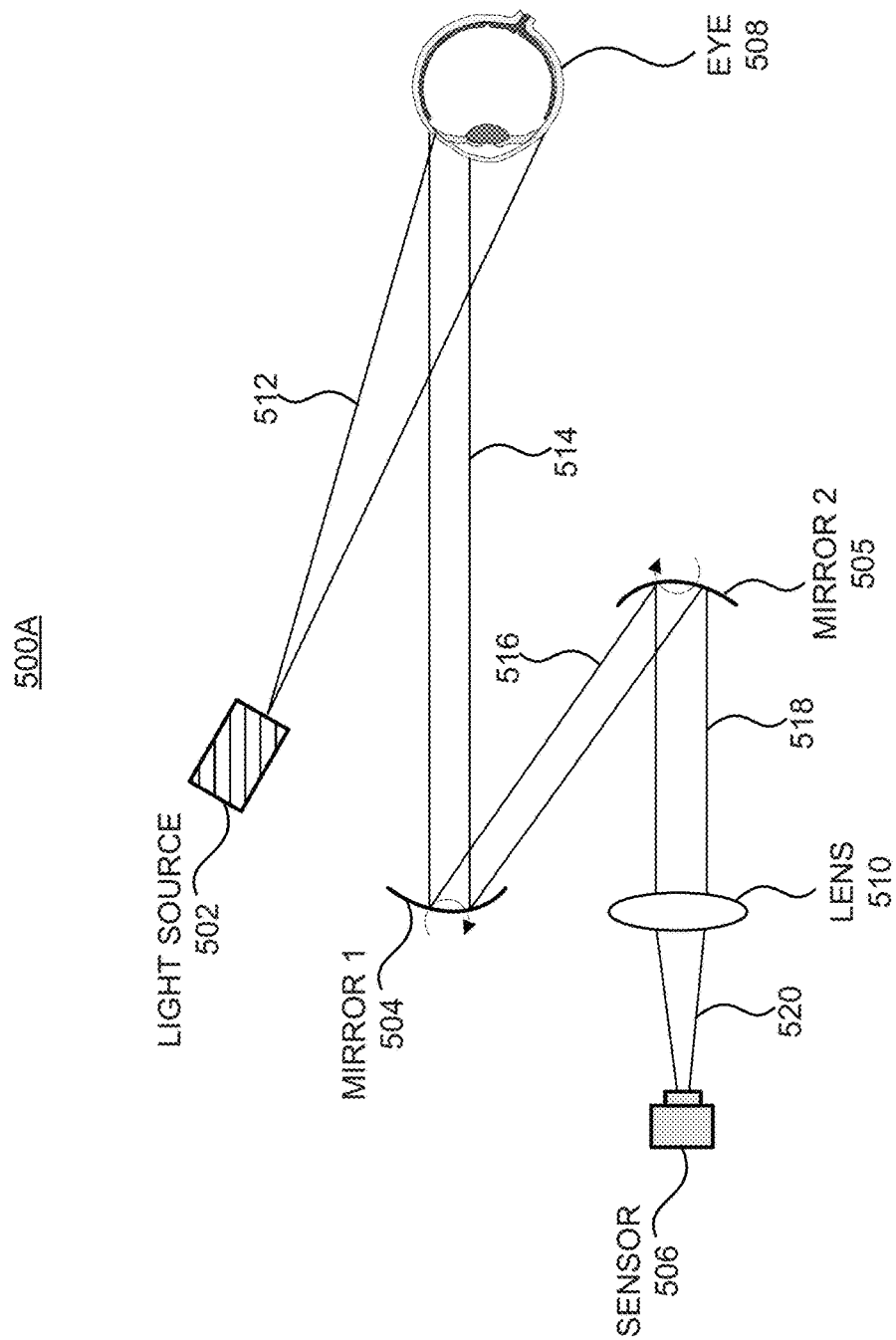

FIGS. 5A-5C illustrate various configurations of a single photon avalanche diode (SPAD) based eye tracking system, where a resolution may be enhanced through projector and/or sensor steering, according to examples. Diagram 500A in FIG. 5A shows a light source 502 illuminating an entire (visible) surface of the eye 508 with illumination light 512. A first mirror 504 may receive first reflected light 514 from a portion (e.g., a small portion such as 1%, 5%, 10%, etc.) of the surface of the eye 508 and reflect to a second mirror 505 as second reflected light 516. The second mirror 505 may reflect the second reflected light 516 toward an optical lens 510 as third reflected light 518. The optical lens 510 may focus the light and provide focused light 520 to the sensor 506.

In some examples, the first mirror 504 and the second mirror 505 and/or the sensor 506 may be steered (e.g., using a micro-electro-mechanical system (MEMS)) such that the sensor 506 light from different portions of the surface of the eye 508, and thereby, captures multiple high-resolution images of small portions of the surface of the eye. The captured images may then be combined (stitched) to generate a high-resolution image of the entire surface of the eye 508. Thus, by only moving the mirrors and/or the sensor, a stationary light source may be used to illuminate the entire eye saving power consumption for the eye tracking system and reducing a complexity of the system.

In some examples, the optical lens 510 may be optional. Instead of using the optical lens 510, curvatures of one or both of the first mirror 504 and the second mirror 505 may be selected such that the second reflected light 516 and/or the third reflected light 518 are focused by the mirrors.

Diagram 500B in FIG. 5B shows the light source 502 also illuminating the entire (visible) surface of the eye 508 with the illumination light 512. The first mirror 504 may receive first reflected light 524 from the entire (visible) surface of the eye 508 and reflect to the second mirror 505 as second reflected light 526. The second mirror 505 may reflect the second reflected light 516 toward the optical lens 510 as third reflected light 528. The optical lens 510 may focus the light from the entire surface of the eye and provide focused light 530 to the sensor 506.

In the configuration of diagram 500B, the single photon avalanche diode (SPAD) sensor may capture a low-resolution image of the entire surface of the eye 508. However, the sensor 506 may be steered to move in very small angles (e.g., 1-2 degrees), each angle corresponding to a different down-sampling on a higher resolution image. Then, interpolation or advanced super-resolution techniques may be employed to recover a high-resolution image and three-dimensional (3D) features of the surface of the eye. Example interpolation techniques may include, but are not limited to, nearest neighbor interpolation, bilinear interpolation, or bicubic interpolation. Example super-resolution techniques may include, but are not limited to, structured illumination, stochastic optical reconstruction, photo-activated localization, stimulated emission depletion, or 4-pi (increasing an image's axial resolution).

Diagram 500C in FIG. 5C shows the light source 502 illuminating a portion (a small portion) of the surface of the eye 508 via first mirror 532 and second mirror 534. A reflection of the illuminated portion of the surface of the eye may be provided via third mirror 536 and fourth mirror 538 to the sensor 506, optionally through the optical lens 510. In some examples, illumination light 542 may be reflected as first reflected light 544 by the first mirror 532 and then as second reflected light 546 by the second mirror 534. The reflection of the illuminated portion of the surface of the eye may be provided as third reflected light 548 to the third mirror 536, which may reflect it as fourth reflected light 550 to the fourth mirror 538. Fifth reflected light 552 from the fourth mirror 538 may be focused by the optional optical lens 510 and provided to the sensor 506 as focused light 554.

In the example configuration of diagram 500C, differently from previous configurations, the light source may illuminate only a small portion of the surface of the eye at one time. By steering the light source 502 and/or the first and second mirrors 532, 534, the entire surface of the eye may be eventually illuminated with each illuminated portion of the surface of the eye being captured by the sensor 506. The captured images may then be combined (stitched) to obtain a high-resolution image of the entire surface of the eye. To ensure a reflection of an illuminated portion of the surface of the eye is captured, movements of the light source 502 and the sensor 506 (and the mirrors) may be temporally synchronized. It should be appreciated that in the example configuration of diagram 500C, power consumption may be higher compared to the configurations of diagrams 500A and 500B as more components are steered.

Figure 6A:
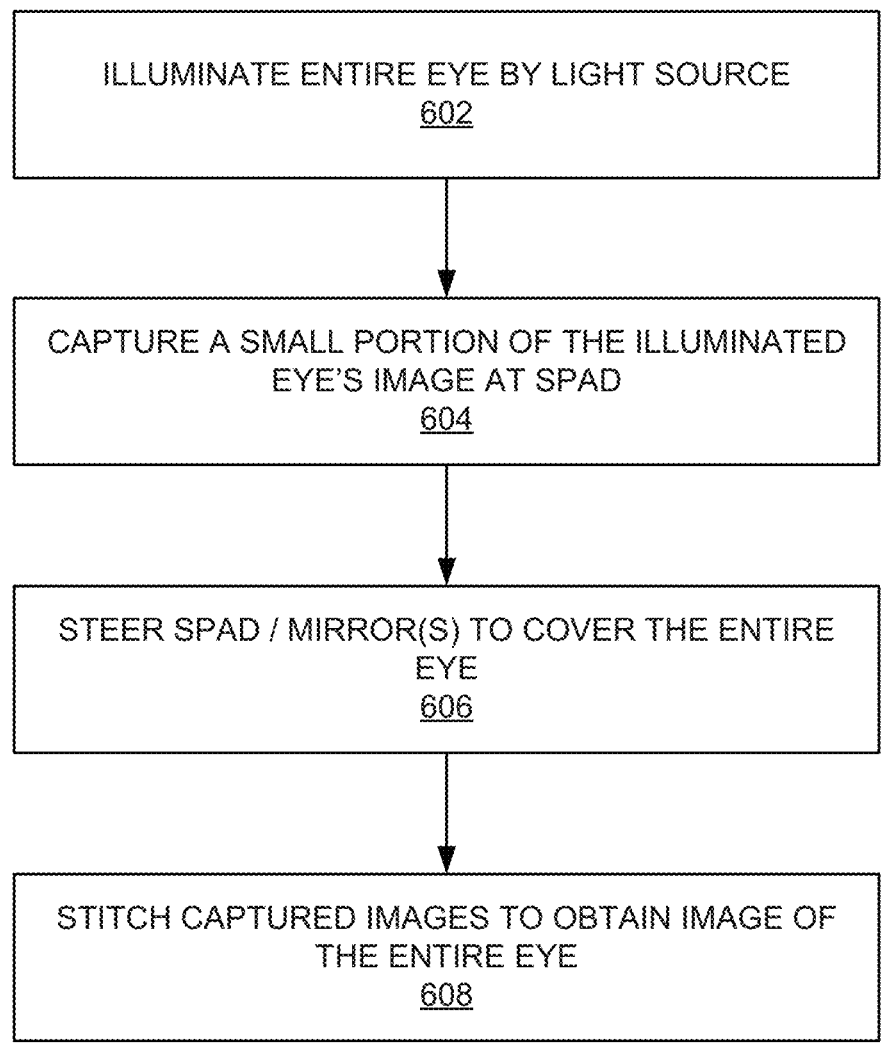
FIGS. 6A-6C illustrate flow diagrams for methods of enhancing resolution in a single photon avalanche diode (SPAD) based eye tracking system through projector and/or sensor steering, according to some examples.
Figure 6B:
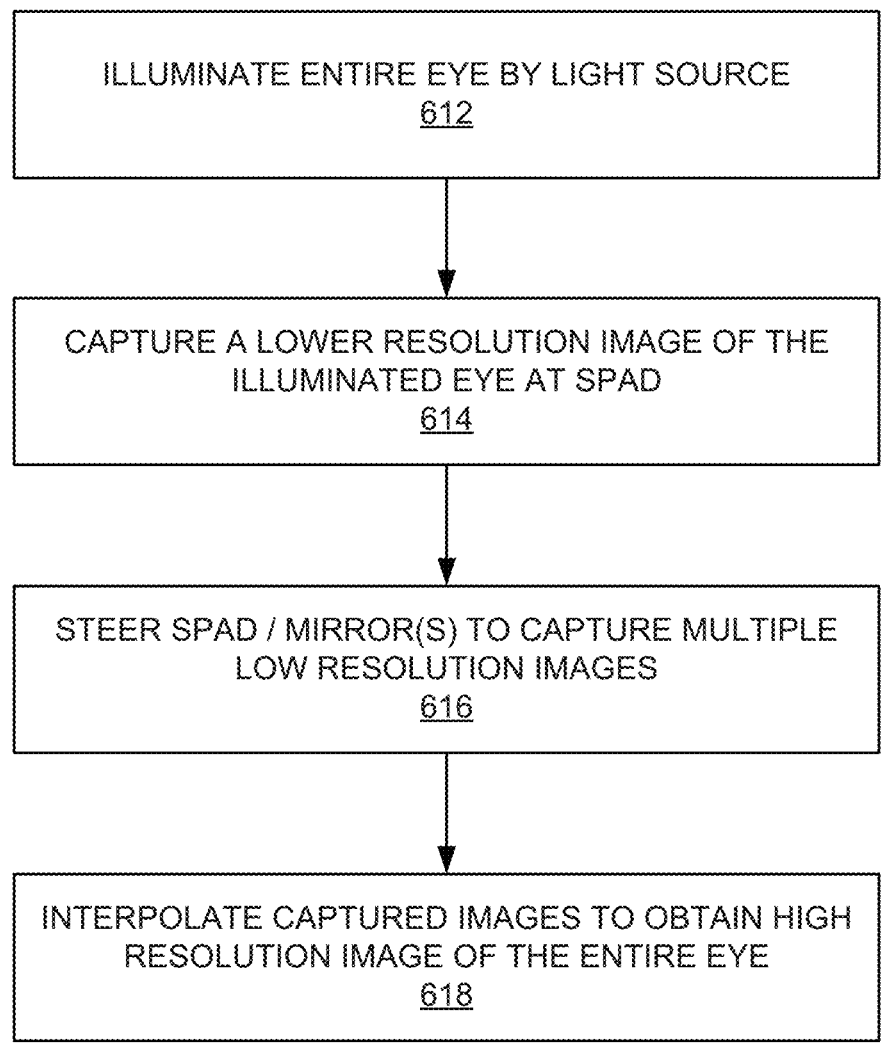
Figure 6C:
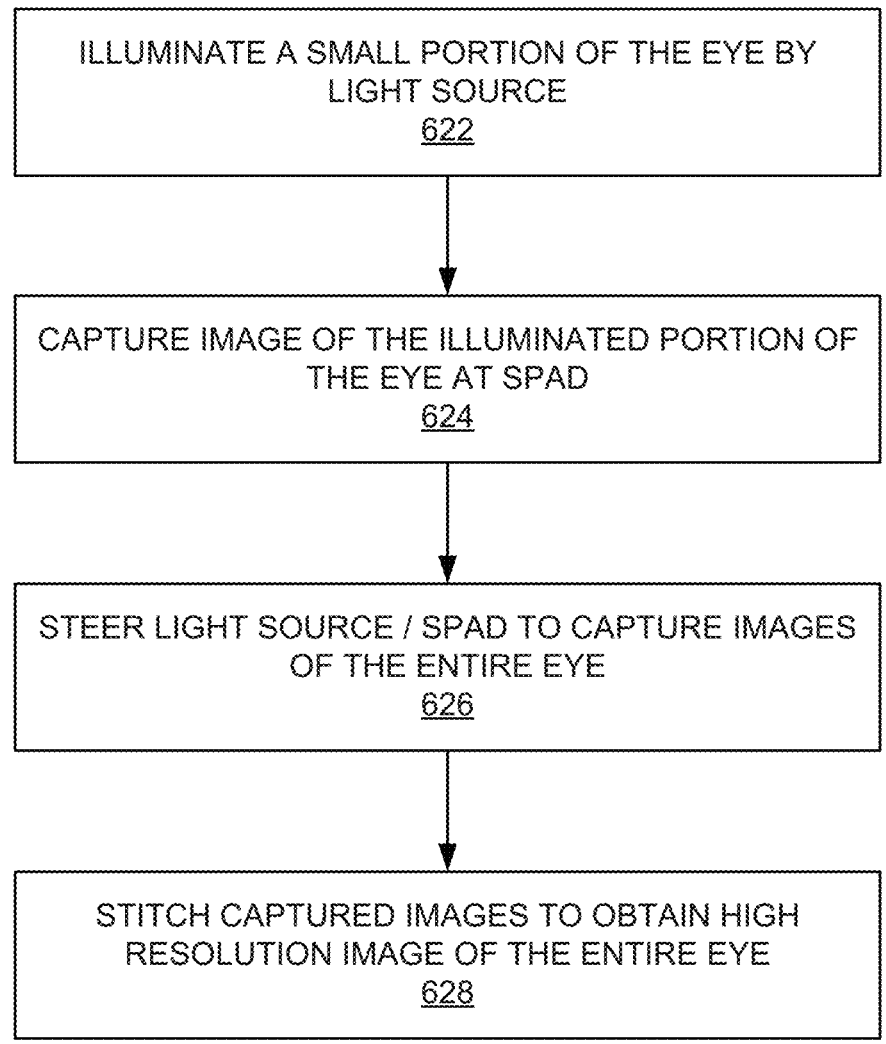

FIGS. 6A-6C illustrate flow diagrams for methods of enhancing resolution in a single photon avalanche diode (SPAD) based eye tracking system through projector and/or sensor steering, according to some examples. The methods 600A, 600B, and 600C are provided by way of example, as there may be a variety of ways to carry out the method described herein. Although the methods 600A, 600B, and 600C are primarily described as being performed by the components of FIGS. 5A-5C, the methods 600A, 600B, and 600C may be executed or otherwise performed by one or more processing components of another system or a combination of systems. Each block shown in FIGS. 6A-6C may further represent one or more processes, methods, or sub-routines, and one or more of the blocks (e.g., the selection process) may include machine readable instructions stored on a non-transitory computer readable medium and executed by a processor or other type of processing circuit to perform one or more operations described herein.

At block 602 of the method 600A, an entire surface of the eye is illuminated by the light source 502. The light source 502 may be a side-emitting laser diode, a vertical-cavity surface-emitting laser (VCSEL) diode, a superluminescent light-emitting diode (SLED), or a light-emitting diode (LED).

At block 604, a small portion of the illuminated surface's image may be captured by the sensor 506. The reflected light may be directed through two mirrors and an optical lens onto the sensor 506. In some examples, the optical lens focusing the reflected light onto the sensor may be left out and a curvature of one or both of the mirrors used instead to focus the reflected light onto the sensor 506.

At block 606, the sensor 506 and/or the mirrors may be steered to cover the entire surface of the eye such that high-resolution images of the portions adding up to the entire surface are captured by the sensor 506. At block 608, the captured images may be combined (stitched) to obtain a complete high-resolution image of the surface of the eye along with three-dimensional (3D) features that may be used in eye tracking.

At block 612 of the method 600B, the entire surface of the eye is illuminated by the light source 502 as in the method 600A. At block 614, a low-resolution image of the entire surface may be captured by the sensor 506. Two mirrors and the optical lens may be used to reflect and focus the light reflected from the entire surface onto the sensor 506.

At block 616, the sensor and/or the mirrors may be steered such that the sensor captures multiple images of the surface of the eye, each image corresponding to a different downsampling. Subsequently, the captured low-resolution images may be used to generate a high-resolution image of the entire surface of the eye through interpolation or super-resolution techniques at block 618. Example interpolation techniques may include, but are not limited to, nearest neighbor interpolation, bilinear interpolation, or bicubic interpolation. Example super-resolution techniques may include, but are not limited to, structured illumination, stochastic optical reconstruction, photo-activated localization, stimulated emission depletion, or 4-pi (increasing an image's axial resolution).

At block 622 of the method 600C, a small portion of the surface of the eye is illuminated by the light source 502. In an example configuration, two mirrors may be used to provide the light from the light source 502 onto the surface of the eye. At block 624, a high-resolution image of the illuminated portion of the surface may be captured by the sensor 506. Two mirrors and the optical lens may be used to reflect and focus the light reflected from the illuminated portion of the surface onto the sensor 506.

At block 626, the light source 502 and/or its associated mirrors may be steered to illuminate other portions of the eye until the entire surface is covered. While the illumination is steered, the sensor and/or the mirrors associated with the sensor may also be steered, synchronously, such that the sensor captures individual, high-resolution images of illuminated portions of the surface of the eye.

At block 628, the captured high-resolution images of the individual portions of the surface of the eye may be combined (stitched) to obtain a complete high-resolution image of the surface of the eye along with three-dimensional (3D) features that may be used in eye tracking.

According to examples, a method of making an enhanced resolution eye tracking system with a single photon avalanche diode (SPAD) using projector and/or sensor steering is described herein. A system of making the eye tracking system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system, comprising:
a light source to direct light to a visible surface of an eye;
a first mirror and a second mirror to redirect the light reflected from at least a portion of the visible surface of the eye;
a sensor to capture the redirected light; and
a processor:
steer at least one of the first mirror, the second mirror, or the sensor to cause the sensor to capture a plurality of images of distinct portions of the visible surface of the eye, wherein the distinct portions of the visible surface of the eye together cover substantially an entire visible surface of the eye, and
generate a full-view image of the entire visible surface of the eye through stitching the plurality of images of the distinct portions of the visible surface of the eye captured by the sensor.

2. The eye tracking system of claim 1, wherein for each of the plurality of images captured by the sensor:
the first mirror and the second mirror are to redirect light reflected from one of the distinct portions of the visible surface of the eye to the sensor, and
the sensor is to capture a low-resolution image of the distinct portion of the visible surface of the eye.

3. The eye tracking system of claim 2, wherein the full-view image of the entire visible surface of the eye generated by the processor is a high-resolution image.

4. The eye tracking system of claim 1, wherein the plurality of images of the distinct portions of the visible surface of the eye captured by the sensor are low-resolution images.

5. The eye tracking system of claim 1, wherein
at least one of the first mirror, the second mirror, or the sensor are steered in distinct angles to cause the sensor to capture a plurality of low-resolution images of the distinct portions of substantially the entire visible surface of the eye, each of the distinct angles corresponding to a different down-sampling of a high-resolution, full-view image of substantially the entire visible surface of the eye, and
the processor is to generate the high-resolution, full-view image of substantially the entire visible surface of the eye through interpolation of the plurality of low-resolution images of the distinct portions of substantially the entire visible surface of the eye.

6. The eye tracking system of claim 1, wherein the sensor comprises a single photon avalanche diode (SPAD) sensor.

7. The eye tracking system of claim 1, wherein the first mirror, the second mirror, or the sensor are steered by a micro-electro-mechanical system (MEMS) via the processor.

8. The eye tracking system of claim 1, wherein the first mirror and the second mirror comprise galvanometric mirrors.

9. The eye tracking system of claim 1, wherein the light source comprises a side-emitting laser diode, a vertical-cavity surface-emitting laser (VCSEL) diode, a superluminescent light-emitting diode (SLED), or a light-emitting diode (LED).

10. The eye tracking system of claim 1, wherein the light source emits at least one of visible light, infrared light, or near-infrared (NIR) light.

11. The eye tracking system of claim 1, further comprising an optical lens to focus the reflected light from the second mirror onto the sensor.

12. The eye tracking system of claim 1, wherein at least one of the first mirror or the second mirror include a selected curvature to focus the reflected light onto the sensor.

13. An eye tracking system, comprising:
a light source to provide light;
a first mirror and a second mirror to redirect the light from the light source to a portion of a visible surface of an eye;
a third mirror and a fourth mirror to redirect the light reflected from the portion of the visible surface of the eye;
a sensor to capture the light redirected by the third mirror and the fourth mirror; and
a processor to:
steer at least one of the light source, the first mirror, the second mirror, the third mirror, the fourth mirror, or the sensor to cause the sensor to capture a plurality of images of distinct portions of a visible surface of the eye, wherein the distinct portions of the visible surface of the eye together cover substantially an entire visible surface of the eye; and
generate a full-view image of substantially the entire visible surface of the eye through stitching the plurality of images of the distinct portions of the visible surface of the eye captured by the sensor.

14. The eye tracking system of claim 13, wherein the sensor comprises a single photon avalanche diode (SPAD) sensor.

15. The eye tracking system of claim 13, wherein the light source, the first mirror, the second mirror, the third mirror, the fourth mirror, and the sensor are steered by a micro-electro-mechanical system (MEMS) via the processor.

16. The eye tracking system of claim 13, further comprising an optical lens to focus the redirected light from the fourth mirror onto the sensor.

17. The eye tracking system of claim 13, wherein at least one of the third mirror or the fourth mirror include a selected curvature to focus the reflected light focused onto the sensor.

18. A method, comprising:
directing light from a light source to a visible surface of an eye;
redirecting the light reflected from the visible surface of the eye by a first mirror and a second mirror;
capturing the redirected light by a sensor;
steering, by a processor, at least one of the first mirror, the second mirror, or the sensor to cause the sensor to capture a plurality of images of distinct portions of the visible surface of the eye, wherein the distinct portions of the visible surface of the eye together cover substantially an entire visible surface of the eye; and
generating, by the processor, a full-view image of substantially the entire visible surface of the eye through stitching the plurality of images of the distinct portions of the visible surface of the eye captured by the sensor.

19. The method of claim 18, wherein the sensor is a single photon avalanche diode (SPAD) sensor.

20. The method of claim 18, further comprising:
steering at least one of the first mirror, the second mirror, or the sensor in distinct angles to cause the sensor to capture a plurality of low-resolution images of the distinct portions of substantially the entire visible surface of the eye, each of the distinct angles corresponding to a different down-sampling of a high-resolution, full-view image of substantially the entire visible surface of the eye; and
generating the high-resolution, full-view image of substantially the entire visible surface of the eye through interpolation of the plurality of low-resolution images of the distinct portions of substantially the entire visible surface of the eye.

* * * * *